United States Patent
Bhaskar et al.

(10) Patent No.: US 10,558,453 B1
(45) Date of Patent: Feb. 11, 2020

(54) SYSTEM AND METHOD TO ACHIEVE SHARED DRIVE FIRMWARE VERSION CONSISTENCY VIA ESRT UPDATE

(71) Applicant: DELL PRODUCTS, LP, Round Rock, TX (US)

(72) Inventors: Anusha Bhaskar, Bangalore (IN); Santosh Hanamant Gore, Bangalore (IN); Chandrashekar Nelogal, Round Rock, TX (US); Raveendra Babu Madala, Bangalore (IN); Muniswamy Setty K S, Bangalore (IN); Sujit Dagadu Jadhav, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 16/219,232

(22) Filed: Dec. 13, 2018

(51) Int. Cl.
*G06F 3/00* (2006.01)
*G06F 8/65* (2018.01)
*G06F 9/4401* (2018.01)
*G06F 13/40* (2006.01)
*G06F 9/54* (2006.01)

(52) U.S. Cl.
CPC .............. *G06F 8/65* (2013.01); *G06F 9/4411* (2013.01); *G06F 9/542* (2013.01); *G06F 13/4022* (2013.01); *G06F 13/4045* (2013.01); *G06F 2213/0028* (2013.01)

(58) Field of Classification Search
CPC ........ G06F 8/65; G06F 9/542; G06F 13/4045; G06F 9/4411; G06F 13/4022; G06F 2213/0028
See application file for complete search history.

(56) References Cited

U.S. PATENT DOCUMENTS 6,772,248 B1 * 8/2004 McClure .............. G05B 19/042
701/24
9,600,378 B2 3/2017 Nelogal et al.
(Continued)

*Primary Examiner* — Jing-Yih Shyu
(74) *Attorney, Agent, or Firm* — Larson Newman, LLP

(57) ABSTRACT

A serial attached small computer system interface system improves shared device firmware version consistency. The system includes servers connected to one of a plurality of controllers, and an expander connected to each of the controllers. A shared device connected to the expander receives a command from a server to be executed at the shared device, and transmits a first broadcast asynchronous event to the expander. The shared device is a serial attached small computer system interface target, and the first broadcast asynchronous event identifies a configuration change in the serial attached small computer system interface target. The expander, in response to receiving the first broadcast asynchronous event, transmits a second broadcast asynchronous event to the controllers. The controllers, in response to receiving the second broadcast asynchronous event, transmits an inquiry command to the serial attached small computer system interface target to determine the configuration change in the serial attached small computer system interface target, and generates an asynchronous event notification. The servers update a firmware version entry in an extensible firmware interface system resource table with a current firmware version of the target in response to the asynchronous event notification.

20 Claims, 4 Drawing Sheets

(56) References Cited

U.S. PATENT DOCUMENTS

| | | | |
|---|---|---|---|
| 2007/0168571 A1* | 7/2007 | Ramsey | G06F 8/65 |
| | | | 710/8 |
| 2011/0119664 A1* | 5/2011 | Kimura | G06F 8/60 |
| | | | 717/173 |
| 2014/0298310 A1* | 10/2014 | Iijima | G06F 8/654 |
| | | | 717/170 |
| 2015/0169331 A1* | 6/2015 | Nelogal | G06F 13/4022 |
| | | | 710/108 |
| 2015/0324186 A1* | 11/2015 | Shin | G06F 8/71 |
| | | | 717/170 |
| 2016/0224437 A1 | 8/2016 | Nelogal et al. | |
| 2016/0324186 A1* | 11/2016 | Lied | A23J 1/04 |
| 2017/0242686 A1 | 8/2017 | Vidyadhara et al. | |
| 2017/0357500 A1* | 12/2017 | Vidyadhara | G06F 13/4081 |
| 2018/0227391 A1* | 8/2018 | Zimmer | H04L 63/123 |

* cited by examiner

SYSTEM AND METHOD TO ACHIEVE SHARED DRIVE FIRMWARE VERSION CONSISTENCY VIA ESRT UPDATE

FIELD OF THE DISCLOSURE

The present disclosure generally relates to information handling systems, and more particularly relates to achieving shared drive firmware version consistency via Extensible Firmware Interface (EFI) System Resource Table (ESRT) update.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A serial attached small computer system interface system improves shared device firmware version consistency. The system may include servers connected to one of a plurality of controllers, and an expander connected to each of the controllers. A shared device connected to the expander receives a command from a server to be executed at the shared device, and transmits a first broadcast asynchronous event to the expander. The shared device is a serial attached small computer system interface target, and the first broadcast asynchronous event identifies a configuration change in the serial attached small computer system interface target. The expander, in response to receiving the first broadcast asynchronous event, transmits a second broadcast asynchronous event to the controllers. The controllers, in response to receiving the second broadcast asynchronous event, transmits an inquiry command to the serial attached small computer system interface target to determine the configuration change in the serial attached small computer system interface target, and generates an asynchronous event notification. The servers update a firmware version entry in an extensible firmware interface system resource table with a current firmware version of the target in response to the asynchronous event notification.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
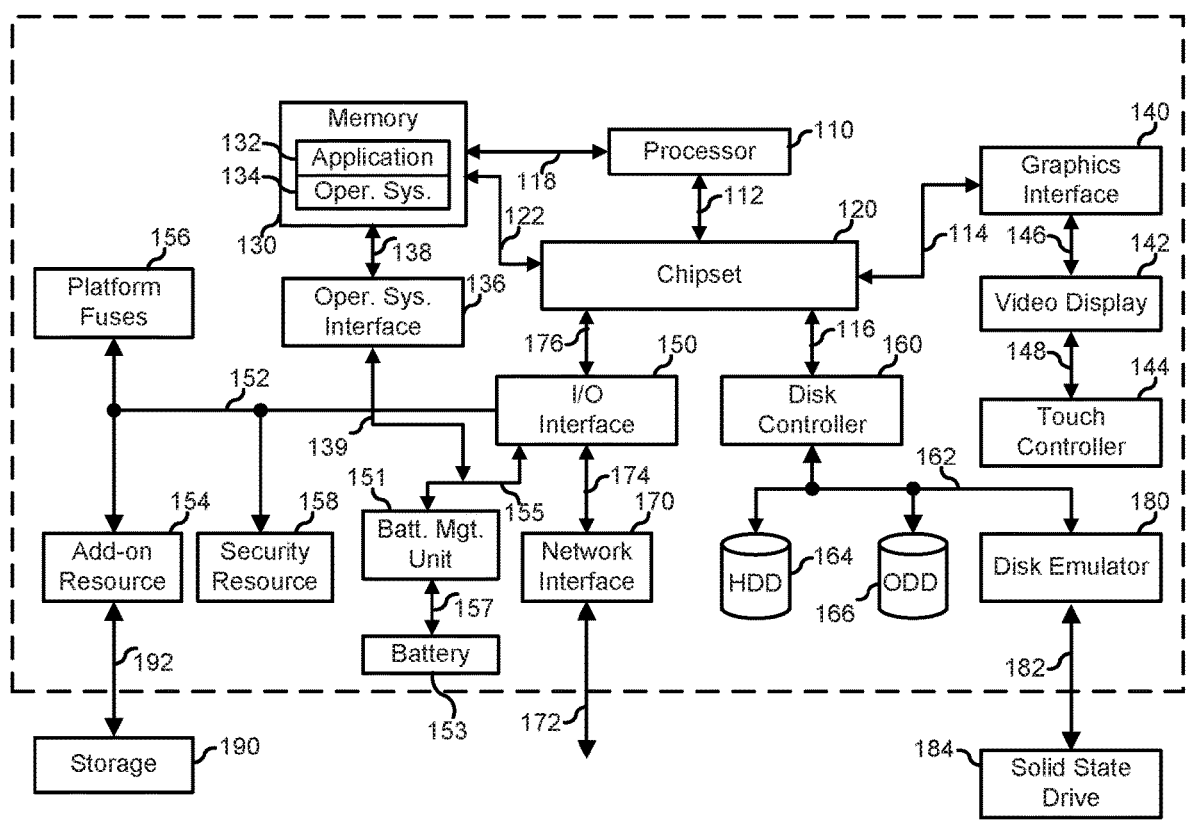
FIG. 1 shows a generalized embodiment of an information handling system.

FIG. 1 shows a generalized embodiment of an information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above and operates to perform one or more of the methods described above. Information handling system 100 includes a processor 110, a chipset 120, a memory 130, a graphics interface 140, a disk controller 160, a disk emulator 180, an input/output (I/O) interface 150, and a network interface 170. Processor 110 is connected to chipset 120 via processor interface 112. Processor 110 is connected to memory 130 via memory bus 118. Memory 130 is connected to chipset 120 via a memory bus 122. Graphics interface 140 is connected to chipset 120 via a graphics interface 114 and provides a video display output 146 to a video display 142. Video display 142 is connected to touch controller 144 via touch controller interface 148. In a particular embodiment, information handling system 100 includes separate memories that are dedicated to processor 110 via separate memory interfaces. An example of memory 130 includes random access memory (RAM) such as static RAM (SRAM), dynamic RAM (DRAM), non-volatile RAM (NV-RAM), or the like, read-only memory (ROM), another type of memory, or a combination thereof. Memory 130 can store, for example, at least one application 132 and operating system 134. Operating system 134 includes operating system code operable to detect resources within information handling system 100, to provide drivers for the resources, initialize the resources, to access the resources, and to support execution of the at least one application 132. Operating system 134 has access to system elements via an operating system interface 136. Operating system interface 136 is connected to memory 130 via connection 138.

Battery management unit (BMU) 151 is connected to I/O interface 150 via battery management unit interface 155. BMU 151 is connected to battery 153 via connection 157. Operating system interface 136 has access to BMU 151 via connection 139, which is connected from operating system interface 136 to battery management unit interface 155.

Graphics interface 140, disk controller 160, and I/O interface 150 are connected to chipset 120 via interfaces that may be implemented, for example, using a Peripheral Component Interconnect (PCI) interface, a PCI-Extended (PCI-X) interface, a high-speed PCI-Express (PCIe) interface, another industry standard or proprietary communication interface, or a combination thereof. Chipset 120 can also include one or more other I/O interfaces, including an Industry Standard Architecture (ISA) interface, a small computer system interface (SCSI) interface, an Inter-Integrated Circuit (I²C) interface, a System Packet Interface (SPI), a Universal Serial Bus (USB), another interface, or a combination thereof.

Disk controller 160 is connected to chipset 120 via connection 116. Disk controller 160 includes a disk interface 162 that connects the disc controller to a hard disk drive (HDD) 164, to an optical disk drive (ODD) 166, and to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be connected to information handling system 100 via an external interface 182. An example of external interface 182 includes a USB interface, an IEEE 1194 (Firewire) interface, a proprietary interface, or a combination thereof. Alternatively, solid-state drive 184 can be disposed within information handling system 100.

I/O interface 150 is connected to chipset 120 via connection 176. I/O interface 150 includes a peripheral interface 152 that connects the I/O interface to an add-on resource 154, to platform fuses 156, and to a security resource 158. Peripheral interface 152 can be the same type of interface as connects graphics interface 140, disk controller 160, and I/O interface 150 to chipset 120, or can be a different type of interface. As such, I/O interface 150 extends the capacity of such an interface when peripheral interface 152 and the I/O channel are of the same type, and the I/O interface translates information from a format suitable to such an interface to a format suitable to the peripheral interface 152 when they are of a different type. Add-on resource 154 can include a data storage system, an additional graphics interface, a network interface card (NIC), a sound/video processing card, another add-on resource, or a combination thereof. As an example, add-on resource 154 is connected to data storage system 190 via data storage system interface 192. Add-on resource 154 can be on a main circuit board, on separate circuit board or add-in card disposed within information handling system 100, a device that is external to the information handling system, or a combination thereof.

Network interface 170 represents a NIC disposed within information handling system 100, on a main circuit board of the information handling system, integrated onto another component such as chipset 120, in another suitable location, or a combination thereof. Network interface 170 is connected to I/O interface 150 via connection 174. Network interface 170 includes network channel 172 that provides an interface to devices that are external to information handling system 100. In a particular embodiment, network channel 172 is of a different type than peripheral interface 152 and network interface 170 translates information from a format suitable to the peripheral channel to a format suitable to external devices. An example of network channels 172 includes InfiniBand channels, Fibre Channel (FC) channels, Gigabit Ethernet channels, proprietary channel architectures, or a combination thereof. Network channel 172 can be connected to external network resources (not illustrated). The network resource can include another information handling system, a data storage system, another network, a grid management system, another suitable resource, or a combination thereof.

Information handling systems such as a SCSI storage system or a serial attached SCSI (SAS) storage system are often grouped in clusters to perform specific tasks. A cluster is a group of independent servers or compute nodes that are managed as a single system and is characterized by higher manageability, availability, and scalability, as compared with groupings of unmanaged servers. In some cluster configurations, many components or devices of the cluster are redundant. Components may include devices like a hard drive, a host bus adapter (HBA) or a controller, an expander, a backplane, and/or a management device. These devices may communicate via the SCSI and/or the SAS protocol.

The clusters often include a shared storage element in which each drive of the shared storage is accessible by each compute node or server of the cluster. From time to time, management and maintenance tasks such as hardware/software inventory, software updates, application of software patches, application of firmware updates/patches, compliance checks and the like are performed to the information handling system. The controller may be operable to perform the firmware updates/patches. For example, the controller is capable of pushing a firmware in a single flash process to a plurality of hardware devices communicatively coupled to the controller. The firmware updates/patches may be initiated by one of the servers in the cluster. This server is referred to as an initiator. The hardware device where the firmware is pushed is referred to as a target.

Currently, the firmware updates/patches may be recorded in an ESRT of the initiator. However, the firmware updates/patches may not be recorded in the ESRT of the other compute nodes or servers in the cluster. Thus, an old firmware version may be reflected in the ESRT of the other servers despite the firmware update which may lead to inaccurate inventory and/or compatibility issues. Further, the information handling system may also fail a compliance check which may lead to unnecessary maintenance. To circumvent the above issues, the system and method disclosed herein propose to achieve consistency of the firmware version across the ESRT of all the servers in the clusters. Further, this consistency is achieved during runtime without the need to take a device offline or a reboot.

Figure 2:
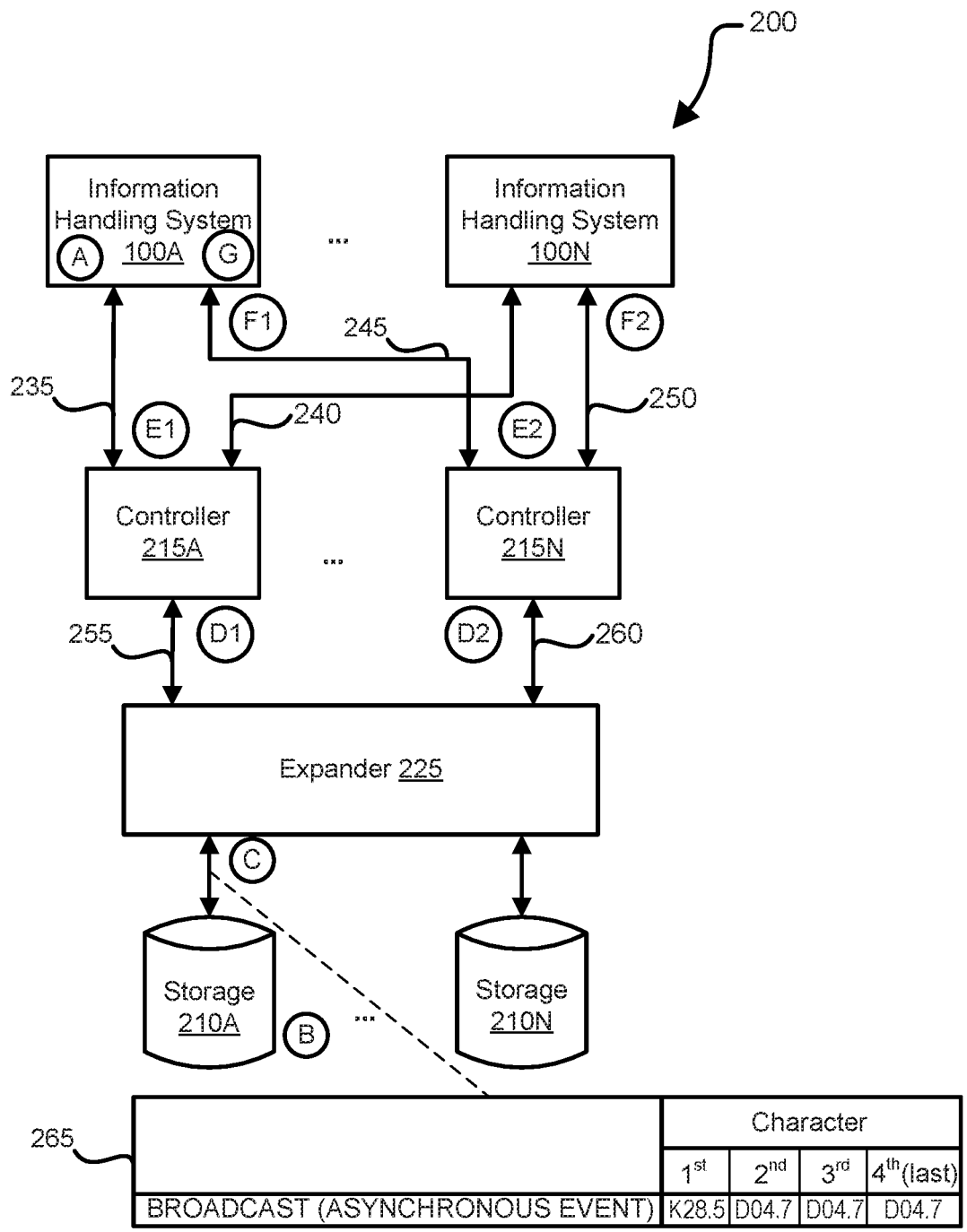
FIG. 2 shows a storage system according to an exemplary embodiment.

FIG. 2 shows a storage system 200 according to an exemplary embodiment. Storage system 200 may be a blade server ecosystem that has a common chassis (not shown) that houses or contains multiple ones of host processors or information handling systems 100A-N (conventionally termed "blades" or "sleds"). Storage system 200 includes multiple ones of controllers 215A-N. Each information handling system of the information handling systems 100A-N may be associated with one of the controllers 215A-N. Storage system 200 may utilize a SCSI, a SAS and/or an FC protocol. The SAS protocol is a connection-oriented protocol that allows storage devices to communicate through a network of high-speed serial physical interconnects. The SAS protocol also supports SAS management protocol (SMP), serial SCSI protocol (SSP) and SATA tunneling protocol (STP). A SCSI/SAS/FC storage system such as storage system 200 may include a plurality of hardware and/or SCSI/SAS/FC devices such as SAS drives, SATA drives, internal hard disk drives (HDDs) and external HDDs that are interconnected via expanders. Other examples of SCSI/SAS/FC devices may include tape drives and/or compact disk drives. System 200 may support a combination of the aforementioned devices.

Information handling system 100A is coupled to a controller 215A via a connection 235. The information handling system 100A is coupled to a controller 215N via a connection 245. The information handling system 100N is coupled to controller 215A via a connection 240. The information handling system 100N is coupled to controller 215N via a connection 250. The information handling systems 100A-N execute instruction code to implement features to interact with storage drives 210A-N. Controller 215A is coupled to expander 225 via a connection 255. Controller 215N is coupled to expander 225 via a connection 260. The connections in storage system 200 may be changeable such that each of information handling systems 100A-N may be coupled to one of controllers 215A-N. There may also be more than one expander connected to controllers 215A-N and/or other devices in storage system 200.

Controllers 215A-N may be configured to direct communications to an address associated with each SCSI and/or SAS device within the storage system. Storage system 200 further includes a SAS expander 225 and multiple of SAS storage drives 210A-N. Expander 225 may be used to link and/or interconnect one or more SCSI and/or SAS devices such as storage drives 210A-N with information handling systems 100A-N via controllers 215A-N. Storage drives 210A-N represent various data storage devices that are each provided with a data interface that operates in accordance with the fabric implemented by controllers 215A-N and expander 225. Storage drives 210A-N may be a shared storage subsystem. A shared storage subsystem may include multiple drives or storage devices accessible by at least two host processors or information handling systems. For example, storage drives 210A-N may include multiple drives wherein each drive is accessible by each one of information handling systems 100A-N.

Controllers 215A-N provide an interface so that a drive can be accessed by an underlying operating system (OS). Controllers 215A-N may be HBAs or storage controllers such as redundant array of independent drives (RAID) controllers. Controllers 215A-N may each be connected to information handling systems 100A-N via a high-bandwidth communication interface, such as a four-lane (×4) PCIe link, an eight-lane (×8) PCIe link, a sixteen-lane (×16) PCIe link, or another high-bandwidth communication interface. Controllers 215A-N may each operate in accordance with a particular storage fabric that is compatible with expander 225, and storage drives 210A-N. An example of a storage fabric includes a SAS fabric, a SATA fabric, a Fibre Channel fabric, a PCIe fabric, or another storage fabric, as needed or desired. Storage drives 210A-N may be implemented internally or externally as an HDD, an ODD, or a solid-state drive (SSD).

Expanders manage the connections between information handling systems, controllers, and/or targets. In addition, expanders are modules that allow SAS controller cards to use more SAS drives. For example, in a typical configuration, a controller may provide a native capacity to control no more than eight storage drives, while an expander may provide a fan-out such that up to 128 storage drives may be attached and controlled by a single controller. Expander 225 operates to increase the number of physical storage drives that can be connected to each of controllers 215A-N. Here, expander 225 is connected to controllers 215A-N and operates to permit the controllers 215A-N to control storage drives 210A-N. Expander 225 may also be connected to other devices, such as a backplane or other SAS drives. The connections on the SCSI and/or SAS devices in storage system 200 may also be changeable such as storage drives 210A-N may connect to the backplane which then connects to expander 225.

Information handling systems primarily use the SAS links for all storage operations and use a different protocol for management operations such as the SMP, for example. Initiators and expanders use the SMP to allow initiators and expanders to query information from each other. The initiators and expanders as used herein may be either SAS and/or SCSI devices or a combination of both. This is done during start-up or when a device is added or removed. In addition, software and system maintenance tasks are typically scheduled to keep systems up to date with the latest software and firmware updates. Firmware compatibility issues may arise such as when one or more of the devices may not have the most up-to-date version of the firmware. Even if the firmware of a device has been successfully updated, the information handling systems may not be aware of the firmware update because there is no function that notifies the information handling system other than the initiator of runtime changes. For example, the ESRT of the information handling systems other than the ESRT of the initiator may not be updated to reflect the updated firmware version of storage drives 210A-N. Thus only the information handling system that initiated the firmware update, also known as the initiator, is aware of the current firmware version of the target. For example, if information handling system 100A is the initiator and storage drive 210A is the target, then the information handling system 100N may not be notified of the firmware update of storage drive 210A. Further, the ESRT of the information handling system 100N may not be updated with the current firmware version of storage drive 210A.

Conventional computer systems are arranged to poll a storage subsystem in order to communicate detected events to software components of the computer system. In response to the polling call, a controller provides event data in a thread (otherwise referred to as an asynchronous event queue) for processing. Conventional controllers do not allow for communication of asynchronous events without being polled. Polling by a mini-port driver in order to keep event information detected by the controller creates network traffic and system overhead. Polling also allows for event information to become stale for certain periods as event information detected is not updated until the next polling call. Because the computer system may support a number of controllers, it may be necessary to poll each controller to update detected asynchronous event information. It is therefore desirable to provide a method and system that can be implemented in SAS domains that allow for communication of asynchronous events such as firmware updates, without being polled. This ensures that the updated firmware version can be propagated at runtime to the other information handling systems in addition to the initiator in the computer system to avoid the information being stale. The stale information, aside from causing inaccurate inventory and failing the compliance report, may cause the compatibility issues among the devices in the computer system.

FIG. 2 is annotated with a series of letters A-G. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

SAS is primarily designed as a third-order interface to connect hard disk drives. SAS can also be effectively used to connect hosts and external storage subsystems. The initiator facilitates communications with SCSI and/or SAS devices. The target may be a SCSI or a SAS device that the initiator communicates with. The target receives, executes, and responds to the command or the request of the initiator. Each one of the information handling system within storage system 200 may be the initiator. In addition, each hardware and/or the SCSI or the SAS device within storage system 200 may be the target. Each SCSI or SAS device may include an address for communication between the initiator and the target within storage system 200 via a controller and an expander. Controllers 215A-N may direct information between the SCSI and/or the SAS devices via an internal or external bus.

At stage A, one of the information handling systems 100A-N may issue a command or request to update a firmware of a target device such as one of the storage drives 210A-N. Information handling system 100A is the initiator. Storage drive 210A is the target. Controller 215A may direct the command between the storage drive 210A and information handling system 100A via expander 225.

At stage B, storage drive 210A verifies and executes the firmware update. The firmware is a program code embedded in a device, such as a storage device, and maintained within or near the device. The firmware for the device most often includes the operational code for the device. The firmware is often stored in a flash memory, which describes a class of memory that is erasable and is able to hold its content without power. From time to time, it may be necessary and/or desirable to update the firmware of a device. As used herein, to update or patch the firmware denotes a change in the firmware. The change in the firmware includes an upgrade or a downgrade of the firmware version. A firmware update may be necessary to correct errors in and/or improve the performance of the device. The process of updating the firmware of the device is sometimes referred to as "flashing" the device, as the firmware update program may replace a software image stored in the flash memory with a second software image.

At stage C, storage drive 210A transmits a SAS primitive to expander 225 upon successful update of the firmware. The SAS primitive is a Dword starting with K28.5 or K28.3 followed by three data characters. For example, storage drive 210A transmits a broadcast asynchronous event to expander 225. The broadcast asynchronous event identifies a configuration change to storage drive 210A due to the firmware update. A table 265 defines encoding for the broadcast asynchronous event.

At stages D1 and D2, expander 225 transmits the broadcast asynchronous event to each of controllers 215A-N. Expander 225 transmits the broadcast asynchronous event to each controller of the multiple computing nodes within storage system 200. Expander 225 may transmit the broadcast asynchronous event to each controller in parallel.

At stages E1 and E2, controllers 215A-N transmits a SCSI inquiry command to determine the configuration change identified in the received broadcast asynchronous event. For example, controller 215A transmits the inquiry to storage drive 210A to retrieve the current firmware version of storage drive 210A. Controller 215N also transmits the inquiry to storage drive 210A to retrieve the current firmware version of storage drive 210A. Storage drive 210A responds to each controller that sent the inquiry. The response includes information regarding storage drive 210A such as a device identifier (ID) and the current firmware version.

At stages F1 and F2, controllers 215A-N transmits an asynchronous event notification (AEN) primitive to information handling systems 100A-N. Controllers 215A-N may transmit the AEN primitive when an asynchronous event, such as the firmware update, occurred in one of the SCSI and/or SAS devices. Controllers 215A-N then update information in their corresponding ESRTs. The ESRT is used to identify device and system resources that have updatable firmware. The ESRT may be populated with one or more values based on the one or more parameters, wherein one or more values are indicated of a unique identifier associated with a version. Each ESRT entry describes a resource that can be targeted by a firmware capsule update and also lists a status of the last attempted update of that resource. For example, one or more values may be indicative of the firmware version for the last attempted update and the status of that update (such as successful, unsuccessful, or any other event indicative of the status). The firmware resource count field indicates how many firmware resources entries for different devices are in the ESRT.

At stage G, information handling system 100A queries the ESRT and updates the inventory. For example, information handling system 100A may send a request sense command to a logical unit of the target to retrieve data associated with the asynchronous event. At this point, each of the information handling systems 100A-N has the updated firmware version of storage drive 210A.

Figure 3:
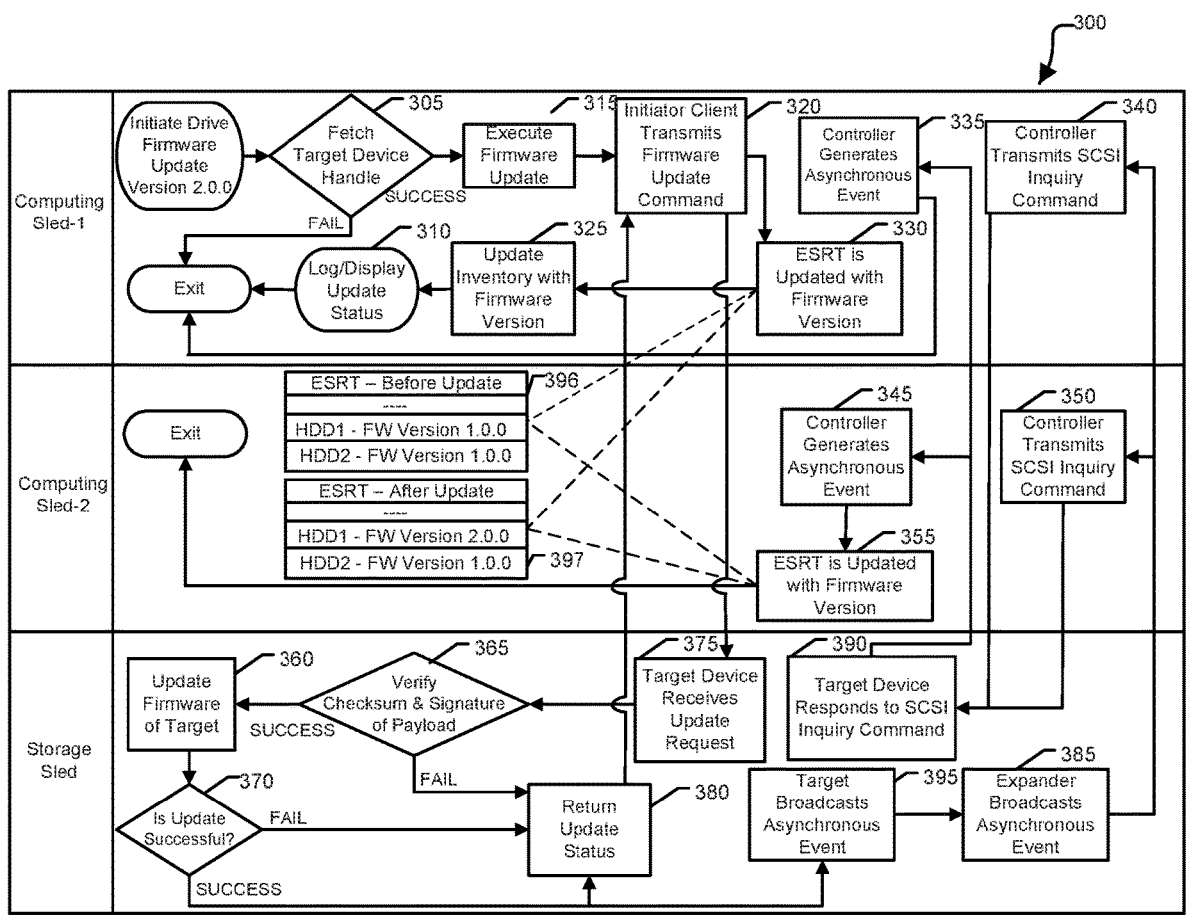
FIG. 3 is a flow diagram illustrating a method for automatic update of firmware revision according to a specific embodiment of the present disclosure.

FIG. 3 shows a method 300 for automatic update of firmware revision according to a specific embodiment of the present disclosure. At block 305, a device handle of a target is fetched or retrieved. The device handle may be retrieved by the initiator at the application layer. The device handle may include a device identifier such as a globally unique identifier (GUID). In a Unified Extensible Firmware Interface (UEFI) architecture, access to devices may be abstracted through the use of "handles" and "protocols." Protocols define how to access a certain type of the device during boot services. Each protocol is accessible through the device's handle. The device handle is used to perform I/O and other operations. A UEFI device path protocol can be used on any device handle to obtain a generic path/location information concerning the physical device or logical device. In other words, the device path describes the location of the device represented by the handle. If the device handle was fetched or retrieved successfully, the flow continues to block 315. Otherwise, the flow terminates.

At block 315, a SCSI execute command is issued to execute the firmware update. The initiator may request a service to be executed on the target. The initiator may issue the execute command to the controller which may then dispatch the execute command to the target. In this example, the execute command is a firmware update of a storage drive. The firmware update may include a firmware code used in updating the storage drive. Upon issuance of the execute command, the flow continues to block 320.

At block 320, the initiator encapsulates the firmware code into a command descriptor block (CDB) and transmits the request via the CDB to the target. The CDB is usually a fixed size block that includes information for the execution of a SCSI command. For example, the first byte of the CDB includes an operation code that specifies the SCSI command that the initiator is requesting the target to perform. The initiator transmits the SCSI command to the target and waits for a response. The initiator may use a transport level protocol such as SSP to transport the SCSI command. An expander in between the initiator and the target may simply route the SCSI command to the intended target. The flow continues to block 375. After the response is received the flow continues to block 330.

At block 375, the target receives the request. The request may include a payload such as the firmware code encapsulated in the CDB. The flow continues to block 365. At block 365, the target verifies the payload's integrity prior to performing the firmware update. The target may verify the firmware's integrity by verifying a checksum value and/or signature of the payload. For example, the checksum may be verified or validated by determining whether the checksum value matches a value that is specified in a firmware file header. After successfully verifying the integrity of the firmware, the flow continues to block 360. Otherwise, the flow continues to block 380.

At block 360, the firmware of the target is updated. Using the device handle, the firmware update is transferred to a nonvolatile random-access memory (NVRAIVI) of the target, thereby replacing the currently operating firmware associated with the target. The flow continues to block 370.

At block 370, if the firmware update of the target device is successful, the flow continues to blocks 380 and 395. Otherwise, flow continues to block 380. At block 395, the target transmits a broadcast asynchronous event to the expander. If there is a multiple of expanders in the storage system, the target transmits the broadcast asynchronous event to each of the expanders. The SAS target port(s) transmit the broadcast asynchronous event primitive to notify the expander that a unit attention condition has been established through the SAS target port in the target. In this example, the target transmits the broadcast asynchronous event to notify the expander of the successful firmware update. Only one broadcast asynchronous event is transmitted to notify each expander for each event. After the firmware update is performed the target drive may be operated using the updated firmware. The flow continues to block 385.

At block 380, the target returns a response to the initiator. The response may be an update status. In particular, the target may send a response primitive which includes a status that indicates a final disposition of the command to the initiator. For example, the response primitive may indicate that the firmware update failed. In another example, the response primitive may indicate that the firmware update is successful. The flow continues to block 320.

At block 385, the expander notifies each of the controllers on multiple computing nodes in the storage system regarding a configuration change with the target. In this example, the configuration change is the updated or current firmware version. The expander notifies the controllers by transmitting a broadcast asynchronous event to the controllers. The broadcast asynchronous event may be transmitted to the controllers in parallel. The broadcast asynchronous event may include the status of the firmware update and the device identifier (ID) of the target. For example, the broadcast asynchronous event may indicate the device ID of the target and that the firmware update of the target was successful. The flow continues to blocks 340 and 350.

At block 340, the controller of the initiator transmits a SCSI inquiry command to the target. The inquiry command may be transmitted to determine the current firmware version of the target. The controller may use the device ID that was included in the received broadcast asynchronous event to identify the target for transmission. The flow continues to block 390.

At block 350, each of the other controllers transmits the SCSI inquiry command to the target. The other controllers are the controllers of the information handling systems of the storage system that did not initiate the firmware update command. The inquiry command may be transmitted to determine the current firmware version of the target. The controller may use the device ID that was included in the received broadcast asynchronous event to identify the target for transmission. The flow continues to block 390.

At block 390, the target receives the SCSI inquiry from the controllers. The target returns a response such as a signal to each of the controllers that issued the SCSI inquiry. The response returned by the target may include peripheral type information that identifies the target, type of device of the target, and the current firmware version. For example, if the target is a tape storage device, the peripheral type information may identify the target as a tape storage device. The peripheral-type information sent by the target may include information regarding the target such as the type of device, the target's manufacturer, make, and model, and the current firmware version. Once the controller has received the peripheral type information, the flow continues to blocks 335 and 345.

At blocks 335 and 345, each of the controllers generates an AEN to the information handling system. In particular, the AEN may be directed to the information handling system's device driver controller. The AEN is a protocol feature that may be used by the target to notify information handling systems and/or the initiator of asynchronous events that occur in the target. This way, the information handling systems can see the configuration change in a plug-and-play manner. The controller may raise an interrupt with the information handling system prior to generating the AEN. The controller may also identify the type of response and/or event prior to raising the interrupt. The information handling system may then handle the interrupt by processing the AEN. After generating the AEN, the flow at the initiator exits. After generating the AEN, the flow at the other controllers continues to block 355.

At block 355, a driver of each of the controller updates the firmware version entry in the ESRT. The driver may use the peripheral type information received from the target for the update. For example, the driver may update ESRT related information such as Firmware Version, Last Attempt status, etc. Once the ESRT is updated, the updated information is now available for processing by the information handling system. A portion of ESRT is shown as a table 396 before the firmware update. A portion of ESRT is shown as a table 397 after the firmware update. After updating the ESRT, the flow exits.

At block 330, the initiator updates the firmware version entry in the ESRT. Once the ESRT is updated, the updated information is now available for processing by the initiator. A portion of the ESRT is shown as table 396 before the firmware update. A portion of ESRT is shown as table 397 after the firmware update. After updating the ESRT, the flow continues to block 325.

At block 325, the information handling system queries the ESRT and updates the inventory of the storage system with the current firmware version. For example, the information handling system may issue a SCSI inquiry command to force an inventory operation. The SCSI inquiry command may instruct the controller to scan the SCSI/SAS/FC interconnection, such as an external and/or internal SCSI bus, to determine how many SCSI/SAS/FC are attached to the storage system. Based on the SCSI inquiry command, each SCSI/SAS/FC device may respond with a respective revision status of their firmware. The initiator may then update a database or file that contains the inventory of the storage system. The flow continues to block 310.

At block 310, the information handling system logs and/or displays the status of the firmware update. The information handling system may also log and/or display other information such as the firmware version as shown in table 397. For example, an application task manager may keep a log file, a list, a map or another format of the firmware update. In another example, the information handling system may display the status of the firmware update. The status may be displayed as a text, a table, a graph or another format. The status can be rendered in Hyper Text Markup Language (HTML), Extensible Markup Language (XML) or in a JavaScript Object Notation (JSON) format. After logging and/or displaying the status of the firmware update, the flow exits.

Figure 4:
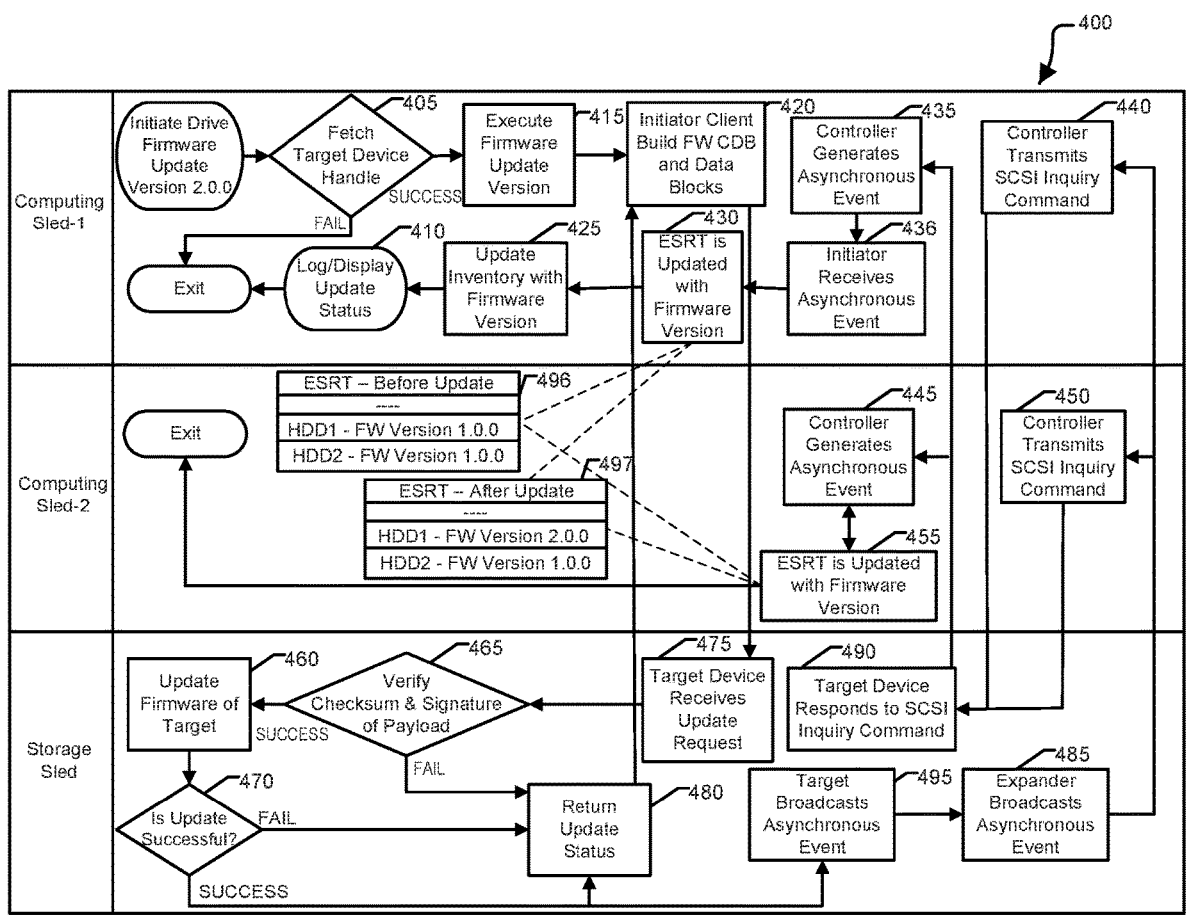
FIG. 4 is a flow diagram illustrating a method for automatic update of firmware revision according to a specific embodiment of the present disclosure.

FIG. 4 shows a method 400 for automatic update of firmware revision according to a specific embodiment of the present disclosure. At block 405, a device handle is fetched or retrieved for a target. If the device handle was fetched or retrieved successfully, the flow continues to block 415. Otherwise, the flow terminates. At block 415, the firmware update is executed. As stated earlier, the firmware update may be executed by an initiator or information handling system issuing a SCSI execute command such as a firmware update request. The firmware update may include a firmware code to update the firmware of a storage device. After issuing the execute command, the flow continues to block 420.

At block 420, the initiator encapsulates the firmware code into a command descriptor block (CDB) and transmits the request to the target. The request may contain other data or information in its payload such as a stack frame. The flow continues to block 475. The initiator waits for a response to the request. After the response is received, the flow exits.

At block 475, the target receives the request from the initiator. After receiving the request, the flow continues to block 465. At block 465, the target verifies the payload's integrity. After successfully verifying the integrity of the payload, the flow continues to block 460. Otherwise, the flow continues to block 480. At block 460, the firmware of the target is updated. After the firmware update, the target drive may be operated using the updated firmware. After updating the firmware, the flow continues to block 470.

At block 470, if the firmware update of the target device is successful, the flow continues to blocks 480 and 495. Otherwise, flow continues to block 480. At block 495, the target transmits a broadcast asynchronous event to a expander to notify the expander of the successful firmware update. The flow continues to block 485. At block 480, the target sends a response primitive to the initiator. The response primitive may indicate a status whether the request was successful or not. The response is sent to the information handling system that initially sent the request and continues to block 420.

At block 485, the expander notifies controllers on multiple computing nodes of the storage system regarding the configuration change such as the firmware update. The expander may use a broadcast asynchronous event for the notification. The flow continues to blocks 440 and 450.

At block 440, the controller of the initiator transmits a SCSI inquiry command to the target. The SCSI inquiry command may be transmitted to determine the current firmware version of the target. The flow continues to block 490. At block 450, each of the other controllers transmits a SCSI inquiry command to the target to determine the current firmware version of the target. The flow continues to block 490.

At block 490, the target receives the SCSI inquiry from the controllers. The target responds to the received SCSI inquiry. Once the controller has received the response, the flow continues to blocks 435 and 445. At blocks 435 and 445, each of the controllers generates an AEN to the information handling systems. The AEN may contain the current firmware version of the target, which may be used to update the ESRT. After generating the AEN, the flow continues to block 436 from block 435 and to block 455 from block 445.

At block 436, the initiator receives the AEN. The AEN may include a bit mask that indicates what event may have occurred. The AEN may also include other information such as the current firmware version of the target. If the AEN does not contain the current firmware version, the initiator may issue a command to determine the current firmware version. For example, the initiator may issue an inquiry command or a command to scan the storage system. The initiator may first register to receive the AEN. After receiving the AEN, the flow continues to block 430.

At block 455, a driver of each of the other controllers updates the firmware version entry in the ESRT. The controllers may use the information included in the AEN for the update. The information handling systems may first register to receive the AEN. The information handling systems register with the controller in order to be notified of an event. After processing the event, the information handling systems may register again with the controller in order to be notified of the (potential) next event. A portion of ESRT is shown as a table 496 before the firmware update. A portion of ESRT is shown as a table 497 after the firmware update. After updating the ESRT the flow exits.

At block 430, the initiator updates the ESRT with the current firmware version. A portion of ESRT is shown as table 496 before the firmware update. A portion of ESRT is shown as table 497 after the firmware update. After updating the ESRT, the flow continues to block 425.

At block 425, the information handling system queries the ESRT and updates inventory of the storage system. The inventory of the storage system may be in a list or a database. After updating the inventory, the flow continues to block 410. At block 410, the information handling system logs and/or displays the status of the firmware update and/or the configuration change. For example, the information handling system logs and/or displays the status of the firmware update and the current firmware version as shown in table 497. The flow then exits.

The flow diagrams are provided to aid in understanding the illustrations and are not to be used to limit the scope of the claims. The flow diagrams depict example operations that can vary within the scope of the claims. Additional operations may be performed; fewer operations may be performed; the operations may be performed in parallel, and the operations may be performed in a different order. For example, the operations depicted in blocks 410 and 425 can be performed in parallel or concurrently. It will be understood that each block of the flow diagram illustrations and/or block diagrams, and combinations of blocks in the flow diagram illustrations and/or block diagrams, can be implemented by program code. The program code may be provided to a processor of a general-purpose computer, special purpose computer, or other programmable machine or apparatus.

While the description in the current disclosure refers to the storage drive as the target, it is understood that this aspect is illustrative, and the scope of the current disclosure is not limited to the storage as the target. In general, the target in the current disclosure may be any of the SCSI and/or SAS devices in a SAS system such as drive, expander, controller, HBA, backplane, etc. Further, the techniques for firmware version consistency as described herein may be implemented with facilities consistent with any hardware system. Many variations, modifications, additions, and improvements are possible. In general, structures and functionality presented as separate components in the example configurations may be implemented as a combined structure or component. Similarly, structures and functionality presented as a single component may be implemented as separate components. These and other variations, modifications, additions, and improvements may fall within the scope of the current disclosure.

While the description in the current disclosure refers to a firmware update for a storage drive, in other embodiments, the firmware update may contain firmware code for all the pieces of a storage system. Firmware fixes may be applied from various firmware defects found in scanning or testing devices attached to the storage system. For example, there may be an HDD drive firmware release, an enclosure firmware release, and a RAID/SCSI/SAS firmware release. The HDD drive firmware release, the enclosure firmware release and the RAID/SCSI/SAS firmware release may be put together as one solution, which may be released as a single unified code, as a single unified release/patch instead of piecemeal, as individual parts. This may ensure that users/or customers receive a complete working solution of compatible firmware revisions.

In other embodiments, the SCSI or SAS device may act as an SCSI or SAS firmware storage device and may store firmware code for all the supported pieces of the storage system that has been released as the single unified code, as the single unified release. The SCSI or SAS firmware storage device may store the firmware code stored in a flash chip. The flash chip may be in one of the information handling systems of the storage system or in a separate component of the storage system.

While the description in the current disclosure refers to a firmware update as a request from an initiator, in other embodiments, the initiator may issue other requests or commands. For example, the initiator transmit an inquiry command or a request to scan the system in response to a detected change such as an addition or removal of a device within the storage system. This inquiry command may then result in updates of the ESRT table based on response(s) received.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method of improving shared device firmware version consistency, the method comprising:
    receiving, by a shared device, a command to be executed at the shared device;
    transmitting, by the shared device, a first broadcast asynchronous event to an expander, wherein the first broadcast asynchronous event identifies a configuration change in the shared device;
    in response to receiving the first broadcast asynchronous event, transmitting a second broadcast asynchronous event to a controller;
    in response to receiving the second broadcast asynchronous event:
        transmitting an inquiry command to the shared device to determine the configuration change in the shared device; and
        generating an asynchronous event notification, wherein the asynchronous event notification identifies the configuration change in the shared device; and
    in response to the asynchronous event notification, updating a firmware version entry in an extensible firmware interface system resource table with a current firmware version of the shared device.

2. The method of claim 1, wherein the configuration change is a revision of a firmware of the shared device.

3. The method of claim 1, wherein the command to be executed at the shared device includes updating a firmware of the shared device.

4. The method of claim 1, further comprising verifying integrity of a payload of the command to be executed at the shared device.

5. The method of claim 4, wherein the verifying the integrity of the payload includes validating a checksum of the payload.

6. The method of claim 1, wherein the transmitting the first broadcast asynchronous event to the expander is performed by the shared device after a successful firmware update.

7. The method of claim 1, wherein the transmitting the second broadcast asynchronous event to the controller includes information regarding the configuration change.

8. The method of claim 1, wherein the transmitting the inquiry command to the shared device is to retrieve the current firmware version of the shared device.

9. The method of claim 1, wherein the controller may raise an interrupt prior to generating the asynchronous event notification is.

10. The method of claim 1, further comprising updating an inventory with the current firmware version of the shared device.

11. The method of claim 1, further comprising responding to the inquiry command with the configuration change in the shared device.

12. The method of claim 1, further comprising initiating an inventory request of devices and current firmware versions of the devices.

13. A serial attached small computer system interface system for improving shared device firmware version consistency, the system comprising:
- a plurality of servers, wherein each server is connected to one of a plurality of controllers;
- an expander connected to each of the controllers; and
- a shared device connected to the expander and configured to receive a command from a server to be executed at the shared device, and to transmit a first broadcast asynchronous event to the expander, wherein the shared device is a serial attached small computer system interface target, and wherein the first broadcast asynchronous event identifies a configuration change in the serial attached small computer system interface target;
- the expander, in response to receiving the first broadcast asynchronous event, to transmit a second broadcast asynchronous event to the controllers;
- the controllers, in response to receiving the second broadcast asynchronous event:
  - to transmit an inquiry command to the serial attached small computer system interface target to determine the configuration change in the serial attached small computer system interface target; and
  - to generate an asynchronous event notification; and
- the servers to update a firmware version entry in an extensible firmware interface system resource table with a current firmware version of the serial attached small computer system interface target, in response to the asynchronous event notification.

14. The system of claim 13, wherein the configuration change is a firmware update of the serial attached small computer system interface target.

15. The system of claim 13, wherein the command to be executed at the serial attached small computer system interface target includes updating a firmware of the serial attached small computer system interface target.

16. The system of claim 15, wherein one of the servers initiates the updating of the firmware.

17. A non-transitory computer-readable medium including code for performing a method, the method comprising:
- receiving, by a target, a command to be executed at the target;
- transmitting a first broadcast asynchronous event to an expander, wherein the first broadcast asynchronous event identifies a configuration change in the target;
- in response to receiving the first broadcast asynchronous event, transmitting a second broadcast asynchronous event to a controller;
- in response to receiving the second broadcast asynchronous event:
  - transmitting an inquiry command to the target to identify the configuration change in the target; and
  - generating an asynchronous event notification, wherein the asynchronous event notification identifies the configuration change of the target; and
- in response to receiving the asynchronous event notification, updating an entry in an extensible firmware interface system resource table with the configuration change.

18. The computer-readable medium of claim 17, wherein the command includes a program code to execute a firmware update at the target.

19. The computer-readable medium of claim 17, the method further comprising updating an inventory with a current firmware version of the target.

20. The computer-readable medium of claim 17, wherein the configuration change includes a current firmware version of the target.

* * * * *